United States Patent

Takahashi et al.

[11] Patent Number: 5,499,202
[45] Date of Patent: Mar. 12, 1996

[54] RESIDUE CIRCUIT

[75] Inventors: Tsugio Takahashi; Hitoshi Fujita, both of Tokyo; Hiroshi Okamoto, Miyagi, all of Japan

[73] Assignee: NEC Corporation, Tokyo, Japan

[21] Appl. No.: 253,057

[22] Filed: Jun. 2, 1994

[30] Foreign Application Priority Data

Jun. 2, 1993 [JP] Japan .................. 5-156294

[51] Int. Cl.$^6$ .................. G06F 7/52; G06F 7/50
[52] U.S. Cl. .................. 364/761; 364/764; 364/784; 364/788
[58] Field of Search .................. 364/761–768, 364/788, 784, 746

[56] References Cited

U.S. PATENT DOCUMENTS

| | | | |
|---|---|---|---|
| 3,925,649 | 12/1975 | Haeusler | 364/763 |
| 4,603,397 | 7/1986 | Ohtsuki et al. | 364/763 |
| 4,635,220 | 1/1987 | Yabe et al. | 364/763 |
| 4,754,422 | 6/1988 | Sakai et al. | 364/761 |
| 5,007,009 | 4/1991 | Azetsu | 364/764 |
| 5,010,511 | 4/1991 | Hartley et al. | 364/764 |
| 5,140,544 | 8/1992 | Lin et al. | 364/761 |

FOREIGN PATENT DOCUMENTS

63-55628  3/1988  Japan .

*Primary Examiner*—Roy N. Envall, Jr.
*Assistant Examiner*—Emmanuel L. Moise
*Attorney, Agent, or Firm*—Foley & Lardner

[57] ABSTRACT

A residue circuit takes weights of even number bits of a dividend as 1 and weights of odd number bits of the dividend as 2. The circuit includes a plurality of adders for summing bits having weight 1 to output weight 1 at a summing output and weight 2 at a carry output, and a plurality of adders for summing bits having weight 2 to output weight 2 at a summing output and weight 1 at a carry output. With these adders, summing of respective bits of the dividend bits are performed taking the weights into account to repeat summing until the number of bits finally becomes 3 bits. Depending upon the pattern of this 3 bits, a remainder is output by a modulus 3 generation circuit.

6 Claims, 9 Drawing Sheets

| S (Sum) = 1 | REMAINDER "1" |
| --- | --- |
| CRY (Carry) = 1 | REMAINDER "2" |

FIG. 3

| S (Sum) = 1 | REMAINDER "2" |
|---|---|
| CRY (Carry) = 1 | REMAINDER "1" |

| a | b | c | a + b + c | OUT (REMAINDER) |
|---|---|---|-----------|-----------------|
| 1 | 1 | 1 | 1 + 2 + 1 = 4 | 1 |
| 1 | 1 | 0 | 1 + 2 + 0 = 3 | 0 |
| 1 | 0 | 1 | 1 + 0 + 1 = 2 | 2 |
| 1 | 0 | 0 | 1 + 0 + 0 = 1 | 1 |
| 0 | 1 | 1 | 0 + 2 + 1 = 3 | 0 |
| 0 | 1 | 0 | 0 + 2 + 0 = 2 | 2 |
| 0 | 0 | 1 | 0 + 0 + 1 = 1 | 1 |
| 0 | 0 | 0 | 0 + 0 + 0 = 0 | 0 |

FIG.10B $C_{out}$

RESIDUE CIRCUIT

BACKGROUND OF THE INVENTION

The present invention relates generally to a residue circuit. More specifically, the invention relates to a residue circuit for calculating a remainder the case where a divisor is 3.

As an example of the conventionally available such type residue circuit, there is a circuit, in which remainders in division of dividends by a divisor of 3 are preliminarily stored employing a read-only-memory (ROM) and the dividends are input as address signal for reading out the preliminarily stored remainders from the ROM.

Figure 9:
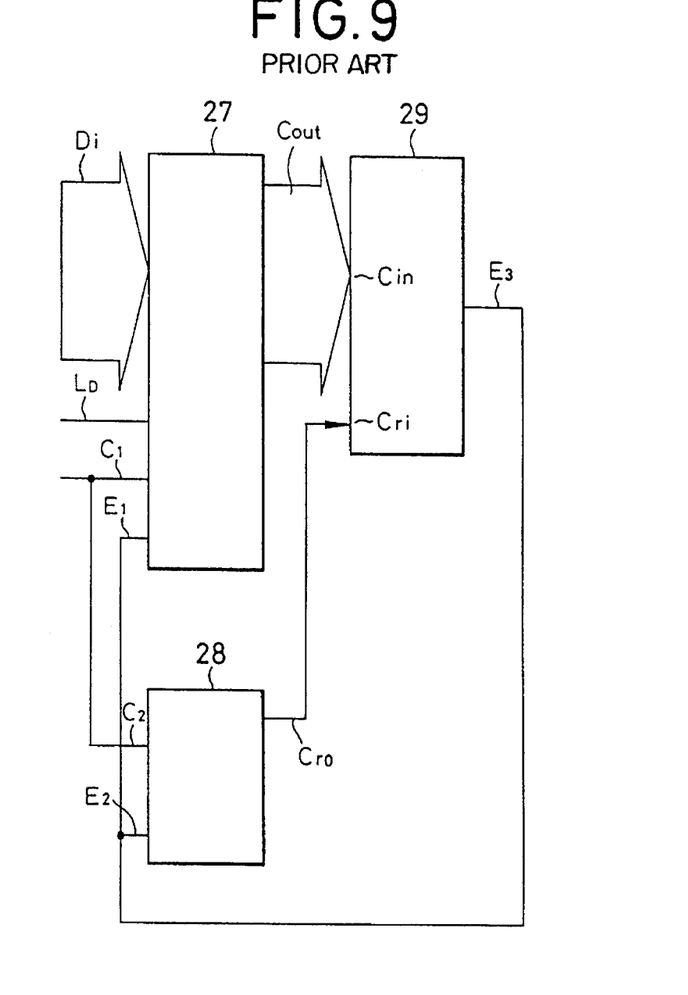
FIG. 9 is a block diagram of the conventional residue circuit.
Figure 10A:
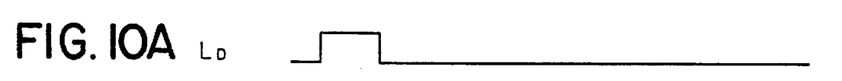
FIGS. 10A to 10E are timing charts showing the operation of the circuit of FIG. 9.
Figure 10B:
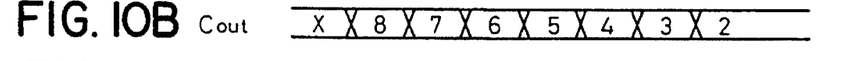
Figures 10C, 10D:
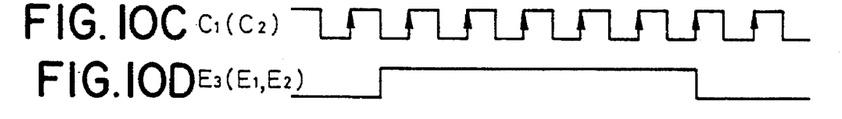
Figure 10E:
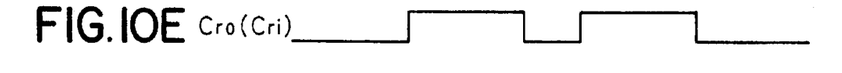

As alternative example, there is a circuit as illustrated in FIG. 9. The shown circuit includes a data input Di, a load signal LD, a clock C1, a subtrahend counter 27 taking an operation enabling signal E2 as input for outputting a counter value $C_{out}$, a divisor counter 28 taking the operation enabling signal E2 as input for outputting a carry $Cr_0$, and a judgement portion 29 taking the counter value $C_{out}$ and the carrier $Cr_0$ as inputs for outputting the operation enabling signal E3.

FIGS. 10A to 10E are timing charts showing operation of the circuit set forth above. Initially, a dividend is loaded in the subtrahend counter 27 by operating the load signal LD. The judgement portion 29 makes judgement of the sizes of the dividend and the divisor of 3 that the operation enabling signal E3 is output when the dividend is greater than or equal to the divisor.

In response to the operation enabling signal E3, the subtrahend counter 27 initiates subtracting operation. In conjunction therewith, the divisor counter 28 performing counting up until the divisor is reached. The judgement portion 29 compares the counter value $C_{out}$ of the subtrahend counter 27 and the divisor again at the timing where the carry signal $Cr_i$ is input so as to continue further counting when the counter value $C_{out}$ is greater than or equal to the divisor and, otherwise, to terminate counting by terminating the operation enabling signal E3. Upon termination of the counter operation, the counter value $C_{out}$ of the subtrahend counter 27 becomes the remainder to be obtained.

In case of the conventional circuit employing the ROM, the ROM having a memory capacity of (number of bits of the divisor ×2 powered by number of bit of dividends) becomes necessary for each dividend. Therefore, according to increasing of number of dividend to be stored, required memory capacity becomes huge.

On the other hand, in case of the circuit illustrated in FIG. 9, since repeated counting process is performed, it takes a long period to obtain the remainder and thus is not suitable for high speed operation.

SUMMARY OF THE INVENTION

Therefore, it is an object of the present invention to provide a residue circuit which permits to obtain a result of operation with a small scale circuit at high speed.

According to one aspect of the invention, a residue circuit for calculating a remainder through division of a dividend of a binary number consisted of a plurality of bits, comprises:

first adding means for summing 3 bits in even number bits of even bit of the dividend to generate a summing output and a carry output;

second adding means for summing 3 bits in odd number bits of even bit of the dividend to generate a summing output and a carry output;

third adding means for summing the summing output of the first adding means and the carry output of the second adding means for generating a summing output and a carry output;

fourth adding means for summing the summing output of the second adding means, the carry output of the first adding means and the carry output of the third means for generating a summing output and a carry output; and a remainder generation means for outputting a remainder with respect to the divisor 3 according to a bit pattern of the summing output of the third adding means, the summing output and the carry output of the fourth adding means.

According to another aspect of the invention, a residue circuit for calculating a remainder of a division for a binary dividend of 0th to nth bits and having at least four bits, comprises:

a plurality of weight 1 adding means setting weights for respective even number bits of the dividend being 1 and for odd number bits of the dividend being 2, for generating a weight 1 signal at a summing output and a weight 2 signal at a carry output through addition of signals of weight 1;

a plurality of weight 2 adding means for summing signals of weight 2 for generating a weight 2 signal at a summing output and a weight 1 signal at a carry output;

the first and second adding means repeatedly performing summing processes for the signals having the same weights until the total number of signals of the summing outputs and the carry outputs becomes m which is smaller than the n; and further comprising a remainder generation means for outputting a remainder with respect to a divisor 3 according to the pattern of the m bits.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The present invention will be discussed hereinafter in detail with reference to the accompanying drawings.

FIGS. 1A, 1B, 2 and 3 are illustrations showing the principle of the present invention. The principle of the invention will be discussed with reference to these drawings.

Figure 1A:
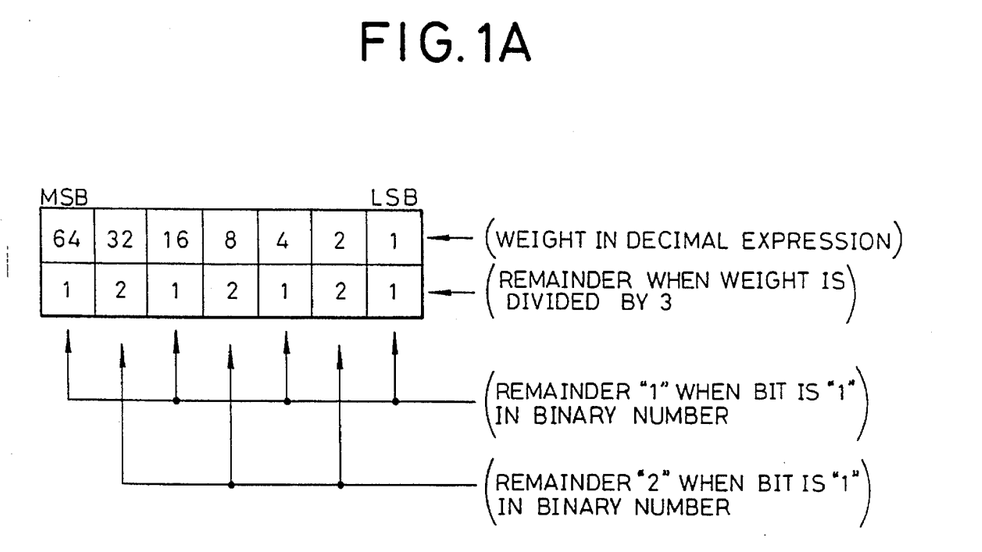
FIGS. 1A and 1B are illustrations showing a principle of the present invention.

Referring to FIG. 1A, there is illustrated an example of 7-bit dividend having 0th bit to 6th bit is illustrated. With taking respective of weights (decimal values) for respective bits, a relationship to the remainder when the weights are divided by 3 is illustrated in FIG. 1A.

Namely, it will be appreciated that when "1" is present in a bit portion of the weight "1" as the 0th bit, the remainder is "1", and on the other hand, when "1" is present in a bit portion of the weight "2" as the 1st bit, the remainder is "2". in general, when "1" is present in the even number bit including 0th bit, the remainder is "1", and when "1" is present in the odd number bit, the remainder is "2".

Figure 1B:
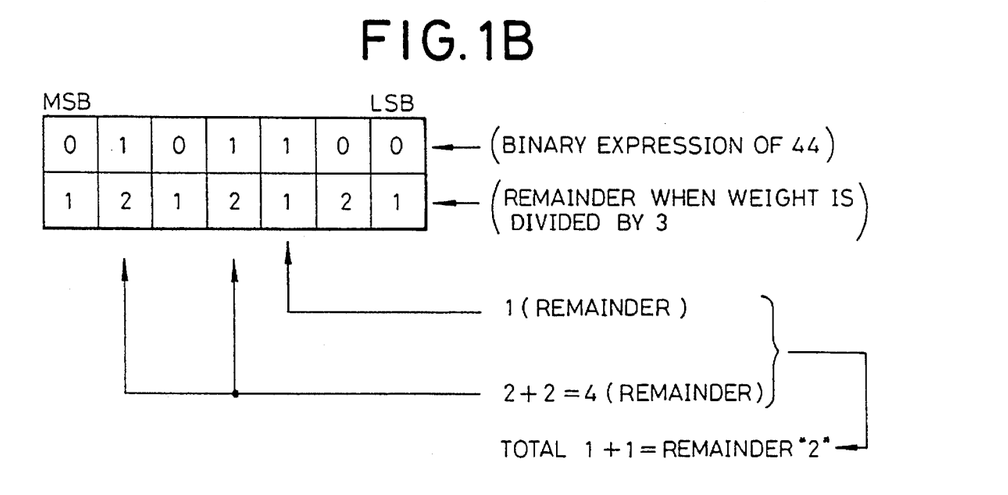

As an example, consideration is given for a decimal value 44, the binary expression and remainders of division for respective weights by 3, the relationship between respective weights and the remainder becomes as illustrated in FIG. 1B. In the dividend 44, only even number bit, in which "1" is present, is the 2nd bit. Therefore, the total remainder of the even number bits becomes "1". On the other hand, the odd number bits, in which "1" is present, are 3rd and 5th bits. Therefore, the sum of the remainders of the odd number bits becomes 4 (=2 +2). This remainder 4 has a remainder 1 with respect to the divisor 3, the final remainder when the dividend 44 is divided by the divisor 3 becomes the sum of 1 of the total of remainder of the even number bits and 1 of the total remainder of the odd number bits, and thus becomes 2 (=1+1).

Therefore, it should be easily appreciated that, by dividing the binary bit pattern into groups of the even number bits (remainder is 1) and the odd number bits (remainder is 2), by deriving a sum of all bits in the even number bit group and a sum of bits in the odd number bit group for obtaining the results of summing for respective groups (sum output and carry output), and by further repeating the summing process, the remainder with respect to the divisor 3 can be finally obtained.

Figure 2:
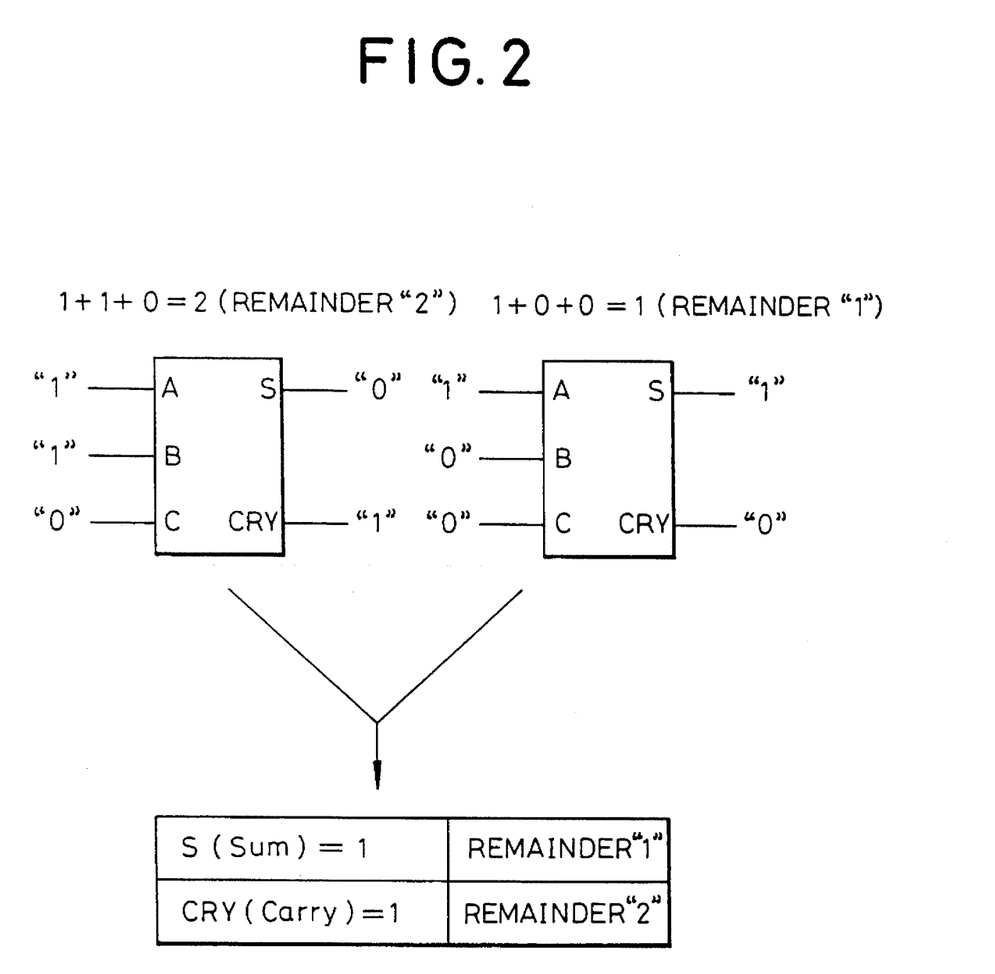
FIG. 2 is an illustration showing a principle of the present invention.
Figure 3:
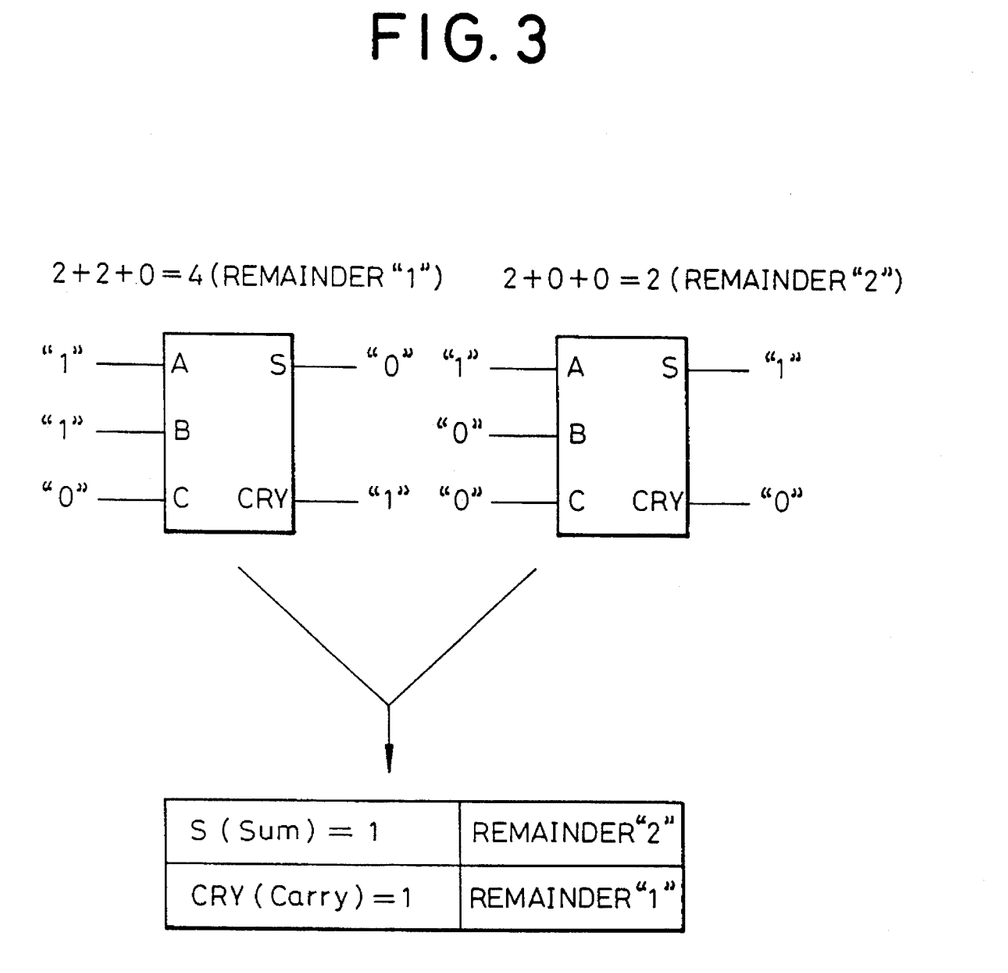
FIG. 3. is an illustration showing a principle of the present invention.

Accordingly, the results of summing of the even number bit group, each of which will have the remainder "1" and of the odd number bit group, each of which will have the remainder "2", are shown in FIGS. 2 and 3. FIG. 2 show a manner of summing of bits expressing the remainder "1", in which is shows the result of summing in the case where inputs are given for a three-input full adder in such a manner of 1+1+0 and 1+0+0.

As can be clear from these examples, the result of summing for the bits expressing the remainder "1" will provide a signal indicative of the remainder "1" in the summing output (S) and a signal indicative of the remainder "2" in the carry output (CRY).

FIG. 3 shows a manner of summing between the bits expressing the remainder "2", in which is shows the result of summing in the case where inputs are given for a full adder in such a manner of 2+2+0 and 2+0+0.

As can be clear from these examples, the result of summing for the bits expressing the remainder "2" will provide a signal indicative of the remainder "2" in the summing output (S) and a signal indicative of the remainder "1" in the carry output (CRY).

On the basis of the fact discussed with respect to FIGS. 1 to 3, a circuit for calculating the remainder with respect to a practical division for 6-bit dividend by the divisor 3.

Figure 4:
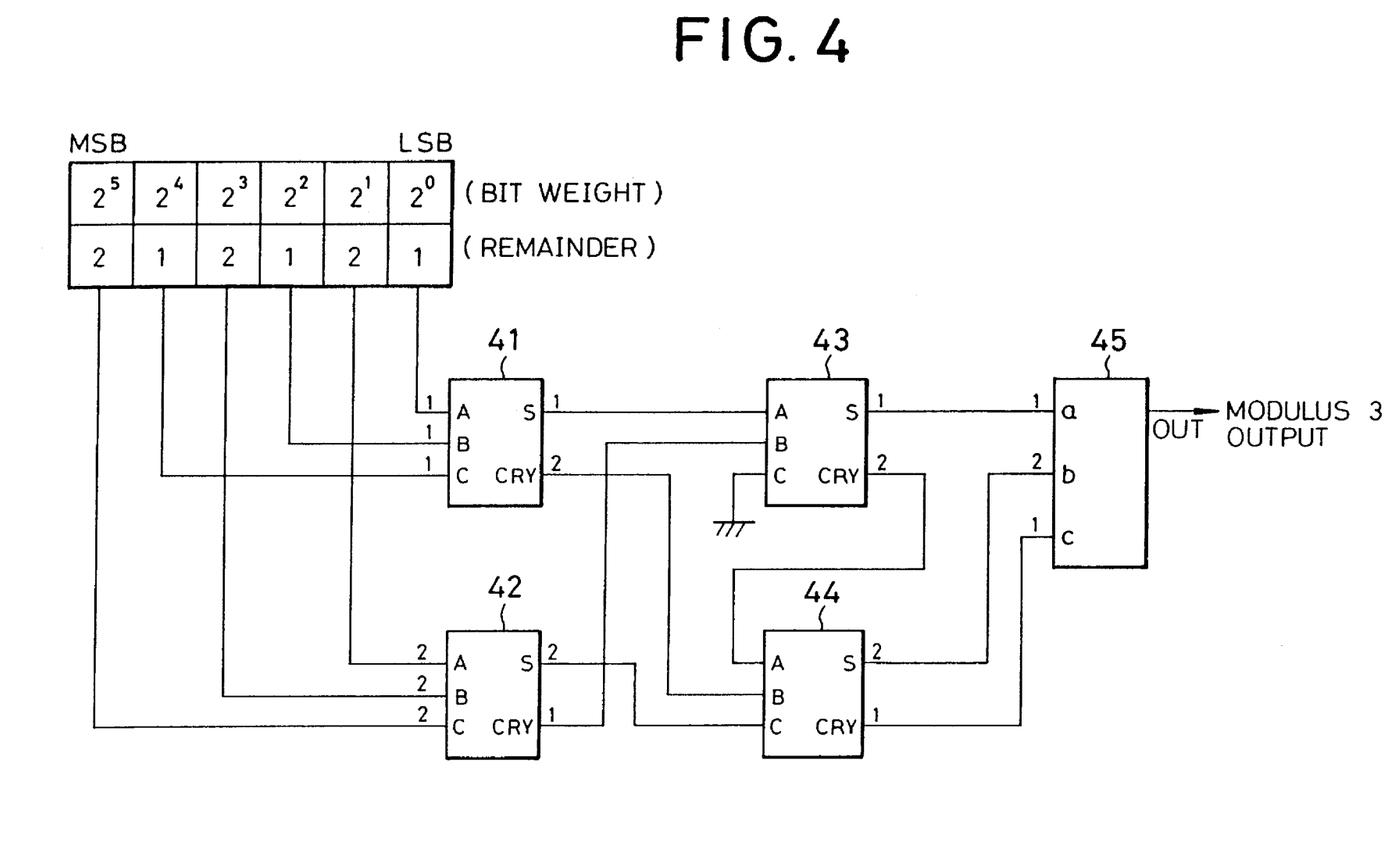
FIG. 4 is a block diagram of one embodiment of the invention.

At first, the even number bit group (three bits, i.e. 0th, 2nd and 4th bits in the shown embodiment) are taken as inputs A to C for full adder 41. Then, the signal indicative of the remainder "1" is obtained in the summing output S and the signal indicative of the remainder "2" is obtained in the carry output CRY are obtained respectively.

It should be noted that, in FIG. 4, FIGS. "1" and "2" labeled on signal lines for respective inputs and outputs of the full adders 41–44 represent the remainders. Hereinafter, these remainders "1" and "2" will be taken as weight for respective signals and will be expressed as weights 1 and 2.

Secondly, the odd number bit group (three bits, i.e. 1st, 3rd and 5th bits in the shown embodiment) are taken as inputs A to C for a full adder 42. Then, the signal indicative of the remainder "2" is obtained in the summing output S and the signal indicative of the remainder "1" is obtained in the carry output CRY are obtained respectively.

Then, the signal S of the weight "1" of the full adder 41 and the signal CRY of the weight "1" of the full adder 42 are applied to two inputs A and B of a full adder 43. The summing output S of the signal of weight "1" and the carry output CRY of the signal of weight "2" are obtained by the full adder 43.

On the other hand, the signal CRY of the weight "2" of the full adder 41, the signal S of the weight "2" of the full adder 42, and the carry signal CRY of the weight "2" of the full adder 43 are applied to three inputs A to C of the full adder 44 to obtain the signal of the weight "2" in the summing output S and the signal of the weight "1" in the carry output CRY.

Thus, when three signals indicative of the weights "1" and "2" are finally obtained, the summing operation is terminated. Then, three-bit signal is input to three inputs a to c of a modulus 3 generation circuit 45. This modulus 3 generation circuit 45 generates the remainder which is determined in straightforward manner depending upon the bit pattern of the three inputs a to c. The modulus 3 generation circuit 45 is adapted to output the remainder and comprises a ROM having 3-bit address input.

Figure 5A:
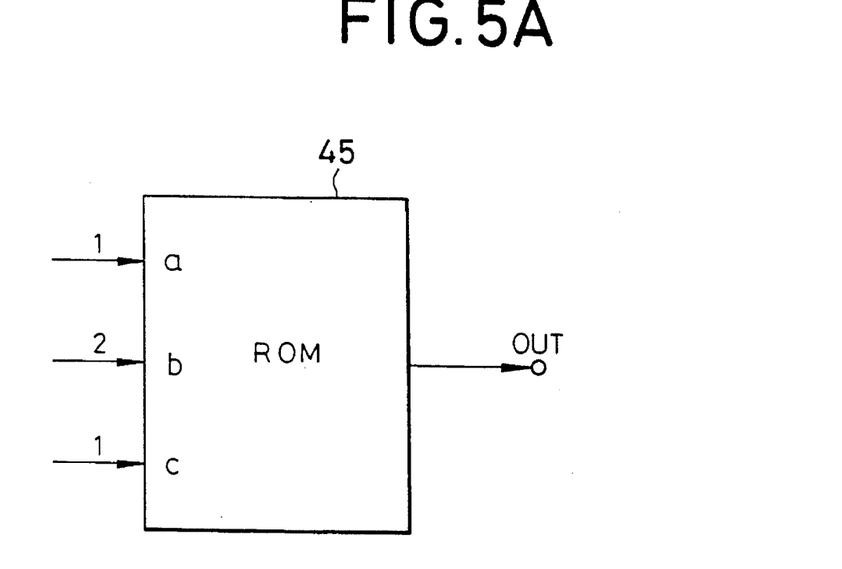
FIG. 5A is an illustration showing one embodiment of a modulus 3 generation circuit of FIG. 4.
Figure 5B:
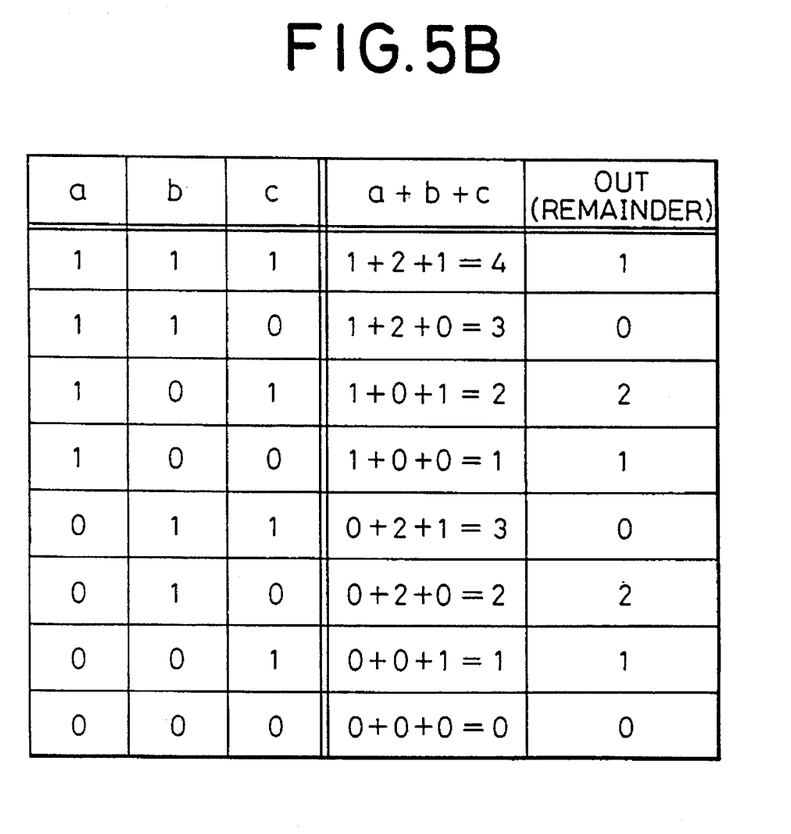
FIG. 5B is an illustration showing a relationship between an input and an output of a ROM in the case where the modulus 3 circuit is constructed by the ROM.

FIG. 5A shows one embodiment of the modulus 3 generation circuit which comprises a ROM having 3 input addresses (each figure represents the weight). FIG. 5B shows a relationship between the three input addresses a, b and c and the remainder output OUT of the ROM set forth above.

Figure 6:
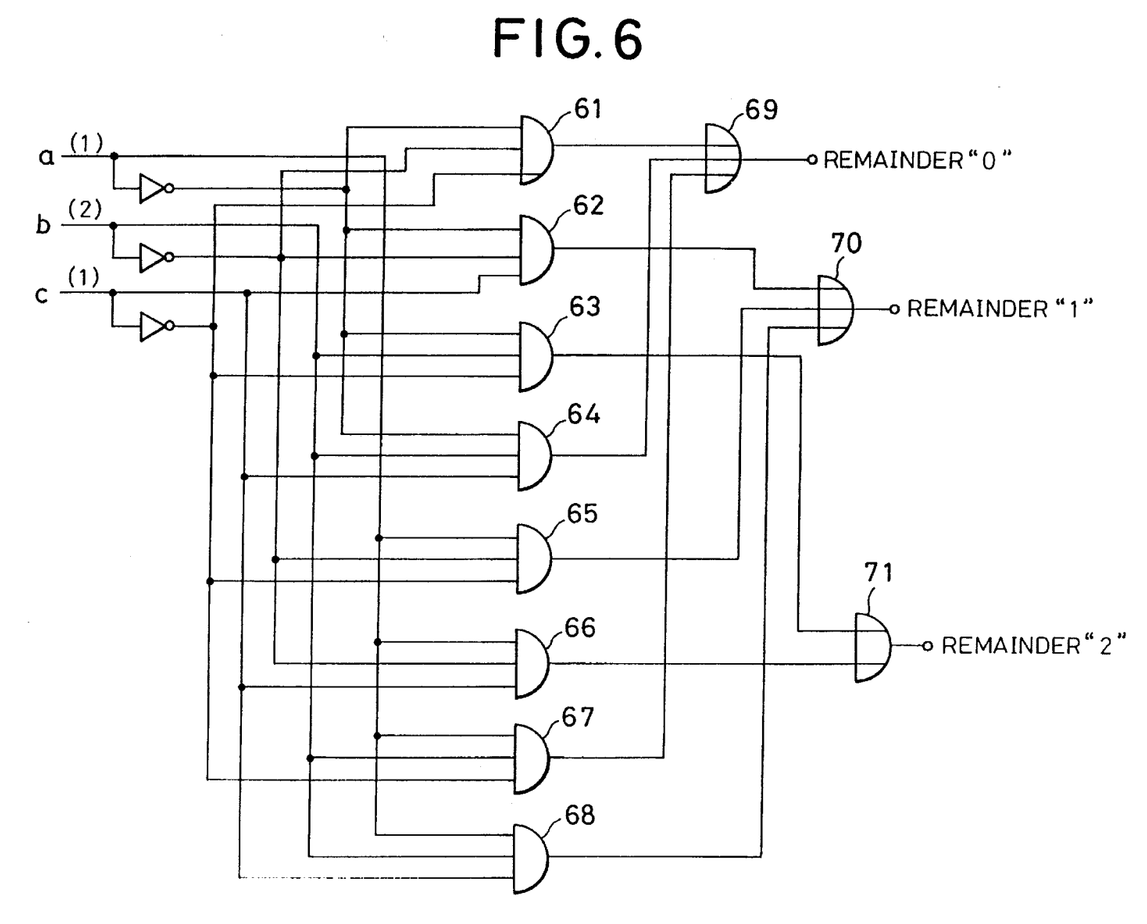
FIG. 6 is a circuit diagram of another embodiment of the modulus 3 generation circuit.

FIG. 6 is a circuit diagram of another embodiment of the modulus 3 generation circuit 45. In the shown embodiment, a combined logic circuit is employed in place of the ROM in the former embodiment three inputs a, b and c and their inverted signals are input to a combined circuit of AND gates 61 to 68 and OR gates 69 to 71. The remainder "0" is obtained from the output of the OR gate 69, the remainder "1" is obtained from the output of the OR gate 70, and the remainder "2" is obtained from the output of the OR gate 71.

Figure 7:
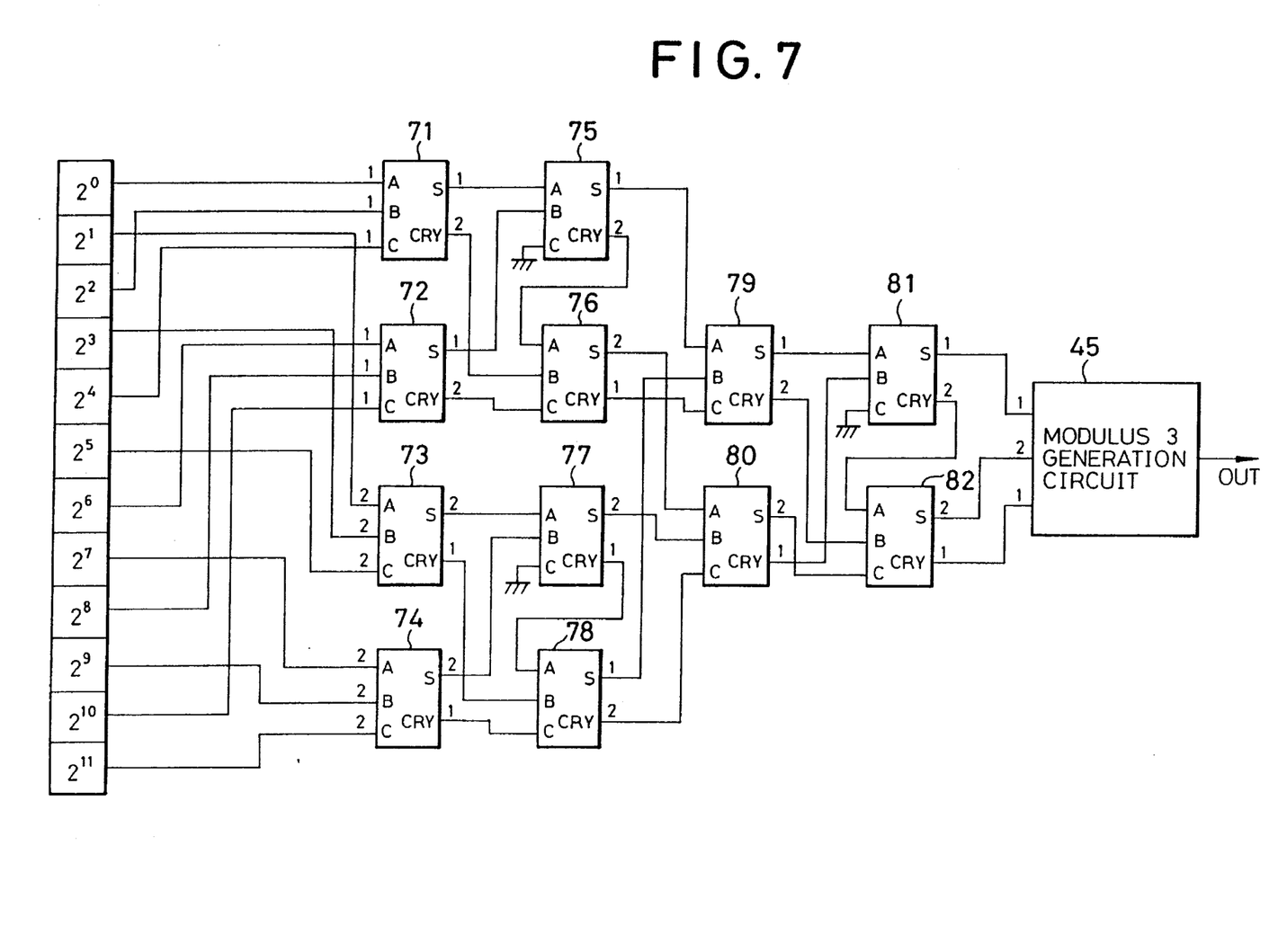
FIG. 7 is a block diagram of another embodiment of the present invention.

FIG. 7 is a circuit diagram showing the embodiment of the present invention, in which the dividend is 12 bits. Even in this embodiment, the FIGS. "1" and "2" out for the input and output signals lines of full adders 71 to 82 represent weights "1" and "2", respectively.

The full adders 71 and 72 perform summing of even number bits (weight "1") of the dividend, and the full adders 73 and 74 performs summing of the odd number bits (weight "2"). The full adder 75 adds the signals S of weight "1" of the former stage full adders 71 and 72. On the other hand, the full adder 76 adds the signals CRY of the weight "2" of the former stage full adders 71 and 72, and the signal CRY of the weight "2" of the full adder 75.

The full adder 77 adds the signals S of weight "2" of the former stage full adders 73 and 74. On the other hand, the full adder 78 adds the signals CRY of the weight "1" of the former stage full adders 73 and 74, and the signal CRY o f the weight "1" of the full adder 77.

Similarly, in the next and subsequent stages, summing processes are performed with the those having the same weights in consideration of the weights of the signals in respective full adders 79 to 82. The above-mentioned summing processes are repeated until the 3 bit signal is finally obtained. The final 3 bit signal is input to the modulus 3 generation circuit 45 to obtain the remainder output OUT.

It should be noted that although all of the summing processes are performed by means of the full adders in the foregoing embodiments, it is possible to replace the adder 43 with two-input half adder, and to replace the adders 75, 77 and 81 with half adders.

Also, though summing processes are repeated until finally converged into 3-bit signals, the number of bits to be finally converged can be 2 bits or 4 bits. In case that the finally converging number of bits is 2 bits or 4bits, the construction of the modulus 3 generation circuit may be modified correspondingly. In short, repeating summing process of the weights having the same value until a number of bits becomes smaller than the number of bits of the dividend to derive the modulus 3 output based on the pattern of the finally obtained bit number. The process set forth above permits to use the memory (ROM) of small capacity while achieving high speed operation.

Figure 8:
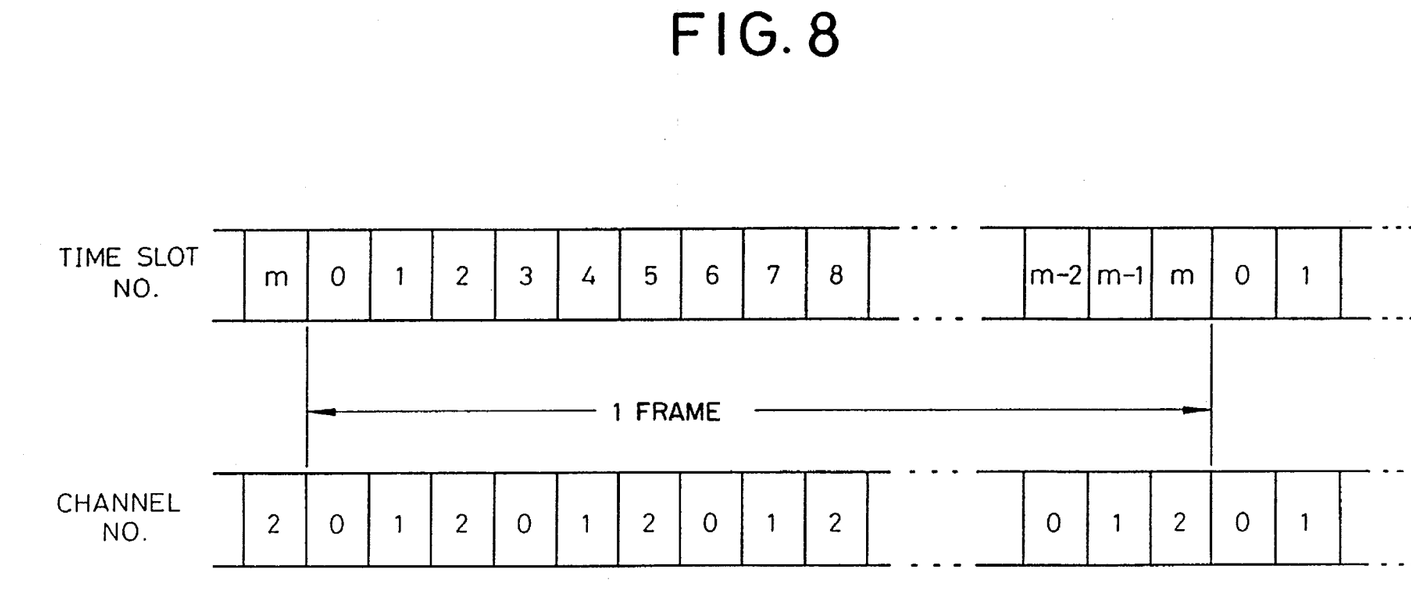
FIG. 8 is an explanatory illustration of an example of application of a residue circuit of the present invention.

One example of application of the above-mentioned residue circuit will be discussed with reference to FIG. 8. In a time division multiplexing communication system, a data transmission method is performed by dividing one frame period into time slots of 0 to m and by assigning data of three channels 0 to 3 for respective time slots, as shown in FIG. 8.

In this case, it becomes necessary to know the channel of the data contained in a certain time slot in one frame. As shown in FIG. 8, the remainder obtained by time slot numbers 0 to m (indicated by binary number) by the number of channels, i.e. 3, will represents the channel number. Accordingly, by applying the time slot numbers 0 to m to the residue circuit of FIGS. 4 and 7 in binary number, channel numbers can be instantly output at the output thereof.

As set forth above, according to the present invention, since the residue circuit can be formed with the adders and ROM or combined logic circuit, the circuit construction becomes simple and high speed operation becomes possible.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A residue circuit for calculating a remainder through division of a dividend of a binary number having six bits, comprising:

first adding means for summing 3 bits in even number bits of even bits of said dividend to generate a summing output and a carry output;

second adding means for summing 3 bits in odd number bits of even bits of said dividend to generate a summing output and a carry output;

third adding means for summing said summing output of said first adding means and said carry output of said second adding means for generating a summing output and a carry output;

fourth adding means for summing said summing output of said second adding means, said carry output of said first adding means and said carry output of said third adding means for generating a summing output and a carry output; and a remainder generation means for outputting a remainder with respect to divisor 3 according to a bit pattern of said summing output of said third adding means, said summing output and said carry output of said fourth adding means.

2. A residue circuit as set forth in claim 1, wherein said remainder generation means is a read-only-memory taking said bit pattern as an address input and outputting said remainder with respect to the divisor 3 corresponding to the address input.

3. A residue circuit as set forth in claim 1, wherein said remainder generation means is a combined logic circuit taking said bit pattern as an input and outputting said remainder with respect to the divisor 3 corresponding to said bit pattern.

4. A residue circuit for calculating a remainder of a division for a binary dividend of 0th to nth bits and having at least four bits, comprising:

a plurality of weight 1 adding means setting weights for respective even number bits of said dividend being 1 and for respective odd number bits of said dividend being 2, for generating a weight 1 signal at a summing output and a weight 2 signal at a carry output through addition of signals of weight 1;

a plurality of weight 2 adding means for summing signals of weight 2 for generating a weight 2 signal at a summing output and a weight 1 signal at a carry output;

said plurality of weight 1 adding means and said plurality of weight 2 adding means repeatedly performing summing processes for the signals having the same weights until the total number of signals of said summing outputs and said carry outputs becomes m which is smaller than n; and further comprising a remainder generation means for outputting a remainder with respect to a divisor 3 according to a pattern of m bits.

5. A residue circuit as set forth in claim 4, wherein said remainder generation means is a read-only-memory taking the pattern of said m bits as an address input.

6. A residue circuit as set forth in claim 4, wherein said remainder generation means is a combined logic circuit taking the pattern of said m bits as an input and outputting said remainder with respect to the divisior 3 corresponding to the pattern of said m bits.

* * * * *